UNITED STATES PATENT OFFICE.

AUGUSTUS ALGOEVER, OF NEW YORK, N. Y.

PROCESS OF CLARIFYING CIDER AND OTHER EXPRESSED JUICES.

SPECIFICATION forming part of Letters Patent No. 358,320, dated February 22, 1887.

Application filed March 26, 1886. Serial No. 196,649. (No specimens.)

*To all whom it may concern:*

Be it known that I, AUGUSTUS ALGOEVER, of the city, county, and State of New York, have invented a new and useful Improvement in Processes of Clarifying Cider and other Expressed Vegetable Juices Obtained from Fruits, Canes, Beets, &c., and of Retarding their Alcoholic or Acetic Fermentation; and I do hereby declare that the following is a full and exact description thereof.

One of the prime causes of the early decomposition of cider and other vegetable juices is the presence therein of pomace and other impurities, which are created in the process of manufacture, and of which more or less remain in the liquid. When the juices are left to themselves, these impurities will not subside but float therein, and aided by the presence of the air decompose, and to a greater or less extent damage the quality thereof, while the clarification of the juices and the separation therefrom of these injurious particles by the customary processes is more or less imperfect, and involves more or less expense.

The object of my invention is to produce from the expressed juice at the very outset a perfectly clear, pure, and sweet liquid which will speedily obtain the fine bright color and superior quality which characterize the well-known grades of mild wines produced from the grapes grown in the vicinity of the river Moselle in Germany.

To carry my invention into effect, I first make a fluid extract of some one of the different kinds of oaks, preferably by the following method: I take very fine shavings of wood which has been cut after the leaves have been shed from the tree, and compress them into an earthenware cylinder, preferably glazed, and which is closed at the bottom by a wooden grating or perforated plate, leaving sufficient space in the upper part of the cylinder above the shavings for a quantity of pure cold water. I then place a series of these cylinders containing the shavings each over a suitable receiving-vessel and charge the first vessel of the series with pure water. The fluid flowing from the bottom of the first cylinder, and which has filtered through the shavings therein and thereby become more or less charged with the soluble vegetable extracts thereof, is poured into the top of the second cylinder so as to filter through its charge of shavings, and flowing thence is transferred to the third cylinder, and so on until the liquid has been thus filtered through about fifteen lineal feet (more or less) of the wood shavings, packed in the cylinders in manner as described.

In this process of obtaining a fluid extract from the wood shavings cold water alone is employed, without heat or mechanical agitation.

Having thus obtained a fluid extract of oak-wood, I add from three-fourths of one per cent. to one per cent. thereof, by measure, to the cider or other juices to be prepared, and after mixing the same add thereto a concentrated solution of dextrine or other vegetable gum, or of albumen or gelatine, as an equivalent, in the proportion of about one part of the solution of dextrine or gelatine to one thousand parts, by measure, of the juice, stirring well while adding the same. The whole is then allowed to stand for from twenty to twenty-four hours, and kept meanwhile at a low temperature, not exceeding 45° Fahrenheit.

The impurities in the liquid will thereupon coagulate and settle, forming a sediment in the vessel, and the pure liquor may thereafter be racked or drawn therefrom by means of a siphon or other equivalent device. The clear fluid thus racked off may be again treated by admixing therewith about three-fourths of one per cent. of the fluid extract of oak-wood, whereupon it will be ready for immediate use, or for storage in barrels or bottles.

If from any cause fermentation should set in in this clarified juice, it may be arrested by adding more of the oak extract in about the same proportions as above.

I regard the fluid extract of willow-wood, chestnut, and buckeye obtained substantially as above described, as substantially the equivalent of the fluid extract of oak-wood for use in my invention, and these fluid extracts may be admixed for use, as described, instead of the oak extract alone.

I am aware that a solution of gelatine and commercial tannin, obtained by boiling, has heretofore been employed in clarifying beer. My invention differs in that it relates to the treatment of the natural juices of fruits and vegetables by means of a watery extract of wood obtained by cold filtration, in which tannin is present in a very different form, and produces, consequently, different effects from that of the tannin of commerce, and in which vegetable gum and a bitter extractive matter having a characteristic flavor, and which operates to prevent or retard the decomposition of the sugar in the juice, is also largely present.

I claim as my invention—

1. The process of treating cider and other vegetable juices, which consists in filtering pure water repeatedly through shavings of oak, willow, or buckeye in manner substantially as described, and mixing the fluid extract so obtained with the vegetable juice, substantially in the proportions herein set forth.

2. The process of treating cider and other vegetable juices, which consists in filtering pure water repeatedly through shavings of oak, willow, or buckeye in manner substantially as described, mixing the fluid extract so obtained with the vegetable juice, and then adding to the mixture a concentrated solution of dextrine, in substantially the proportions and manner set forth.

In testimony whereof I have signed my name to this specification in the presence of two subscribing witnesses.

AUGUSTUS ALGOEVER.

Witnesses:
WM. S. GUERINEAU,
J. LEVY.